United States Patent
Daniels et al.

(10) Patent No.: US 7,142,401 B2
(45) Date of Patent: Nov. 28, 2006

(54) DETECTING OVERCURRENTS IN A SWITCHING REGULATOR USING A VOLTAGE DEPENDENT REFERENCE

(75) Inventors: Paul J. Daniels, Mesa, AZ (US); David E. Bien, Glendale, AZ (US); Gerrit M. Foerstner, Mesa, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 236 days.

(21) Appl. No.: 10/804,450

(22) Filed: Mar. 19, 2004

(65) Prior Publication Data

US 2005/0206359 A1    Sep. 22, 2005

(51) Int. Cl.
*H02H 7/00* (2006.01)
*G05F 5/00* (2006.01)
*G05F 1/56* (2006.01)

(52) U.S. Cl. .................. 361/18; 323/299; 323/285
(58) Field of Classification Search .............. 361/97, 361/93.1, 18, 94; 323/285, 299, 300, 301; 353/56.03, 56.04
See application file for complete search history.

(56) References Cited

U.S. PATENT DOCUMENTS

| | | | |
|---|---|---|---|
| 4,017,789 A * | 4/1977 | Morris | 323/285 |
| 4,668,905 A | 5/1987 | Schierjott | |
| 4,761,722 A | 8/1988 | Pruitt | |
| 5,710,697 A * | 1/1998 | Cooke et al. | 363/21.11 |
| 5,717,319 A | 2/1998 | Jokinen | |
| 5,764,040 A | 6/1998 | Miller | |
| 5,903,422 A * | 5/1999 | Hosokawa | 361/93.1 |
| 6,400,544 B1 * | 6/2002 | Grimm et al. | 361/94 |
| 6,570,748 B1 * | 5/2003 | Sanzo | 361/93.1 |
| 6,670,794 B1 * | 12/2003 | Wang et al. | 323/213 |
| 6,760,203 B1 * | 7/2004 | Usui | 361/18 |
| 6,911,808 B1 * | 6/2005 | Shimamori | 323/283 |

FOREIGN PATENT DOCUMENTS

EP        0686903 B1    12/1995

\* cited by examiner

*Primary Examiner*—Karl Easthom
*Assistant Examiner*—Harry R Behm
(74) *Attorney, Agent, or Firm*—James L. Clingan, Jr.

(57) ABSTRACT

A switching regulator provides energy to an inductor-capacitor combination that supply a DC voltage as an output. The presence of a current that can be significantly lower than the typical load current is detected using a pulse signal that provides a measure of the current supplied by the regulator to the inductor. A comparator compares this signal to a reference voltage that is related to the current level to be detected. This reference voltage is adjustable based on the voltage applied by the regulator and the voltage being ultimately supplied as the DC output voltage. The comparator and a capacitor perform an integration function that results in a voltage that ramps upward if the current threshold is being exceeded. When this ramping voltage passes a predetermined level, a signal is provided to indicate that the threshold has been exceeded.

11 Claims, 2 Drawing Sheets

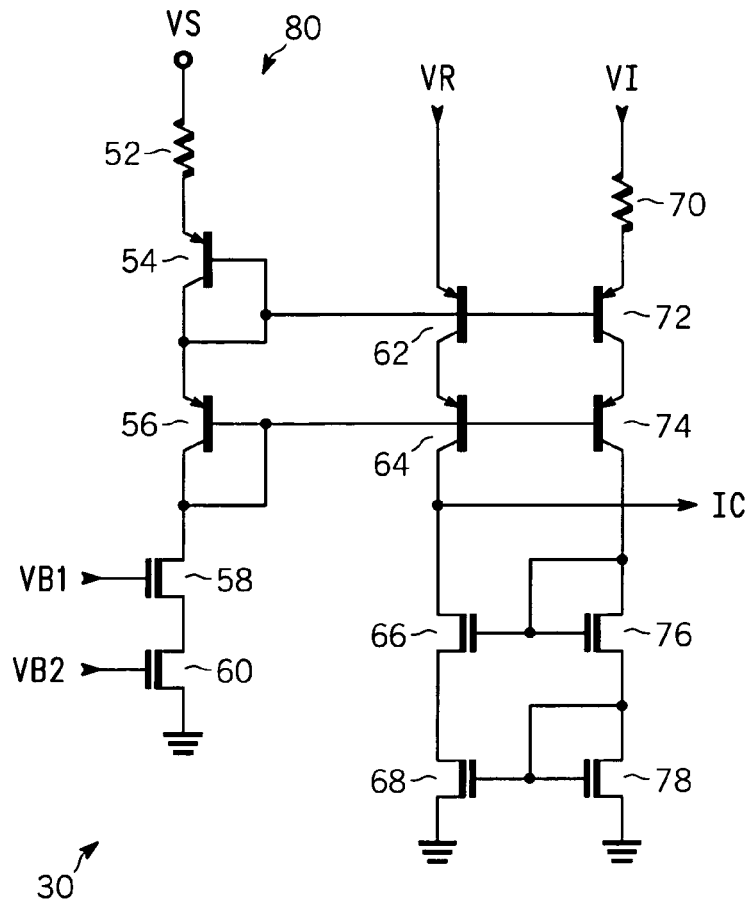
*FIG. 2*
*FIG. 3*
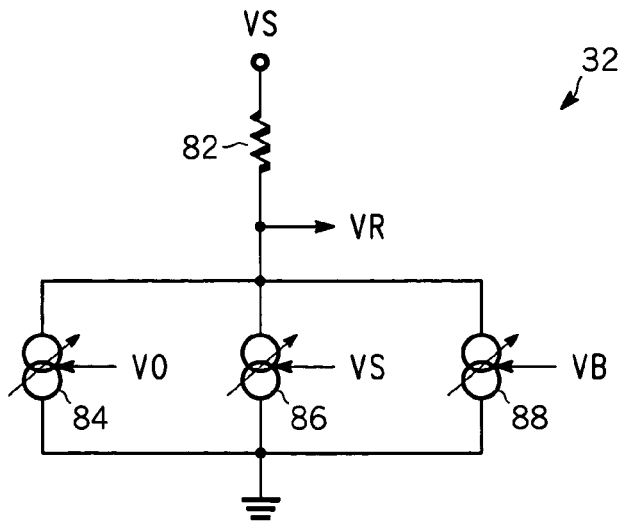

US 7,142,401 B2

DETECTING OVERCURRENTS IN A SWITCHING REGULATOR USING A VOLTAGE DEPENDENT REFERENCE

FIELD OF THE INVENTION

This invention relates to switching regulators, and more particularly, to detecting the current level being supplied by a switching regulator.

RELATED ART

Switching regulators are commonly used in a situation in which the available power supply is at a voltage that is significantly higher than what is needed by other circuitry. In such case the switching regulator provides a reduced voltage for use by this other circuitry in which the conversion is relatively efficient. Detecting the current being supplied can be useful in many systems applications. One such use is when there is a short circuit or the load begins drawing excessive current. This is commonly called a crowbar current and effective means have been developed for performing a detection of such a crowbar event. Another purpose is for situations in which the fault is relatively small compared to the typical load current. In such a case the crowbar type detectors are not helpful. This fault condition that is manifested by a low current may be an early indicator of a more serious fault condition. For example, a system that has a fault condition that has not been fully developed may exhibit a leakage current that should not be present. If this leakage current can be detected, operation can be terminated and/or repair made before the inevitable catastrophic failure occurs. This has been addressed in the past by circuitry near the load, that is circuitry that can directly monitor the load conditions, such as directly measure the load current. These processes have been effective to an extent but require significant space and are relatively slow in detecting the fault current, typically because of their relative isolation from the switching devices. There are situations in which it is important to detect the fault as early as possible. In such cases, either some faults may go undetected sufficiently quickly or normal operation is slowed.

Thus, there is a need to provide a current detector for a switching regulator that improves on one or more of these issues.

BRIEF DESCRIPTION OF THE DRAWINGS

The present invention is illustrated by way of example and not limited by the accompanying figures, in which like references indicate similar elements, and in which:

FIG. 2 is a circuit diagram of a first portion of the switching regulator of FIG. 1; and FIG. 3 is a combination circuit and block diagram of a second portion of the switching regulator of FIG. 1.

Figure 1:
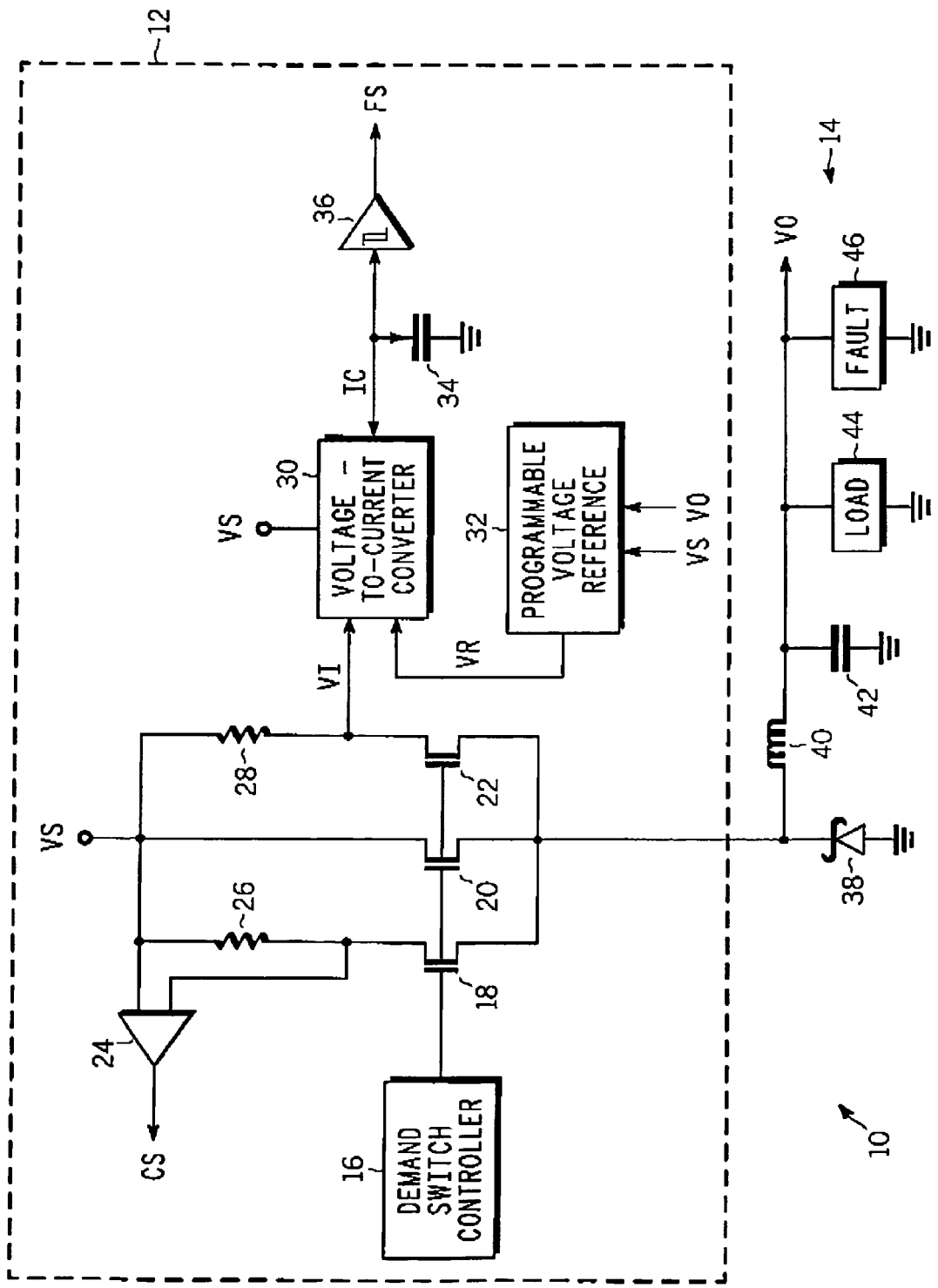
FIG. 1 is a combination circuit and block diagram of a switching regulator having a current detector according to an embodiment of the invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

In one aspect, a switching regulator provides energy to an inductor-capacitor combination that supply a DC voltage as an output. The presence of a current that can be significantly lower than the typical load current is detected using a pulse signal that provides a measure of the current supplied by the regulator to the inductor. A comparator compares this signal to a reference voltage that is related to the current level to be detected. This reference voltage is adjustable based on the voltage applied by the regulator and the voltage being ultimately supplied as the DC output voltage. The comparator and a capacitor perform an integration function that results in a voltage that ramps upward if the current threshold is being exceeded. When this ramping voltage passes a predetermined level, a signal is provided to indicate that the threshold has been exceeded. This is better understood by reference to the figures and the following description.

Shown in FIG. 1 is a switched regulator 10 comprising an active circuit 12, and a reactive network 14. Active circuit 12 provides the energy to reactive network 14 in the form of pulses which reactive network 14 converts to a DC voltage. Reactive network 14 comprises a diode 38 that is preferably a Schottky diode but could an PN junction diode or a switching transistor, an inductor 40, a capacitor 42, a load 44, and a fault 46. Active circuit 12 comprises a demand controller 16, an N channel transistor 18, an N channel transistor 20, an N channel transistor 22, a comparator 24, a resistor 26, a resistor 28, a voltage-to-current converter 30, a programmable voltage reference 32, a capacitor 34, and a Schmitt Trigger 36. Demand controller 16 determines when a pulse of energy is to be supplied to reactive circuit 14 in conventional switching regulator fashion by providing an active output signal to the gate of transistor 20. This active output is also coupled to the gates of transistors 18 and 22 for use in current detection.

Transistors 18, 20, and 22 have sources connected together as the switching output of active circuit 12. Resistor 26 has a first terminal connected to the drain of transistor 18 and a second terminal connected to a positive power supply terminal for receiving a voltage VS. Comparator 24 has a first output connected to the positive power supply terminal, a second terminal connected to the drain of transistor 18, and output to provide a crowbar signal that is active when a crowbar event has occurred. Comparator 24 is a conventional crowbar detector that detects when the current has simply exceeded some peak even for a short time. Transistor 20 has a drain connected to the positive power supply terminal. Resistor 28 has a first terminal connected to the positive power supply terminal and a second power terminal connected to the drain of transistor 22. Voltage-to-current converter 30 has an input connected to the drain of transistor 22, is coupled to the positive power supply terminal, and has an output coupled to a first terminal of capacitor 34 and an input of Schmitt trigger 36. Capacitor 34 has a second terminal coupled to ground. Schmitt Trigger 36 has an output that provides fault signal FS as an active signal when the current provided at the output voltage VO exceeds a predetermined amount. Diode 38 has a first terminal connected to the output of active circuit 12 and a second terminal connected to ground. Inductor 40 has a first terminal connected to the output of active circuit 12 and a second terminal connected to a first terminal of capacitor 42 that provides output voltage VO. Capacitor 42 has a second terminal connected to ground. Load 44 has a first terminal coupled to the output voltage VO and second terminal connected to ground. Fault 46 has a first terminal connected to the output voltage VO and a second terminal connected to ground.

In operation, there are two normal modes; one with load 44 connected and one with no load connected. With load 44 present, demand switch controller 16 clocks transistors 18–22 on and off to provide the needed energy to maintain output voltage VO at the desired voltage. Transistor 20 provides the energy and transistors 26 and 28 are for current detection. When load 44 is not connected, the output voltage VO is maintained by the action of demand switch controller 16 and transistor 20 but at a lower switching frequency. If there is a defect such as fault 46 present, the operation of transistor 22 and resistor 28 becomes important in the hope of detecting the presence of fault 46. The amount of current drawn for load 44 is 5 amps. The current for a fault such as fault 46 is considered to be as low as 100 milliamps (mA) and a fault should be detected at least by 200 milliamps. The input voltage VI to voltage-to-current converter 30 is lower than the supply voltage VS by the drop across resistor 28 caused by the current through transistor 22. The large current through transistor 20 causes a voltage differential between the drain of transistor 20 at supply voltage VS and the source, which is the output to reactive circuit 14. A bigger drop across transistor 20 indicates a larger current supplied to reactive circuit 14. During each pulse that causes transistors 18, 20, and 22 be conductive, the current begins at zero and increases as transistor 20 remains conductive. Transistor 22 causes very little voltage drop due to the small current therethrough so the voltage drop across resistor 28 tracks the current characteristic of transistor 20 very well. Thus, the pulse provided as input signal VI is changed in shape from the current pulse provided by transistor 20 by being voltage representation that is an inversion of that current.

Programmable voltage reference 32 provides a reference voltage VR which is related to the output voltage VO and the power supply voltage VS. When the input voltage VI drops below reference voltage VR, a current pulse is generated so that current flows into capacitor 34, raising the voltage thereof. When the input voltage VI is higher than reference voltage VR, converter 30 withdraws current from capacitor reducing the current at capacitor 34. For the case where fault 40 draws 100 mA or more, the frequency of pulses of VI is such that the current pulses filling capacitor 34 puts in more charge than is withdrawn in the absence of the current pulses. Thus the voltage at capacitor 34 continues to increase until Schmitt Trigger 36 is triggered and signal fault signal FS is provided as an active signal indicating a fault is present at the output voltage VO. Converter 30 and capacitor 34 function as a type of integrator and the result is an output that is indicative of the current being supplied at output voltage VO and could be used as the output indicative of the presence of a fault. This is an integrator in that to the extent the charge entering 34 exceeds the removal of charge, the charge is accumulated. This output at capacitor 34, although trending upward in this fault case, is switching up and down, which explains the use of a circuit with hysteresis such as a Schmitt Trigger. Schmitt Trigger 36 provides an output signal that is at a constant voltage so long as the input thereto stays a above a minimum voltage. In this example, the Schmitt Trigger fires when the output of the integrator, which capacitor 34 and converter 30 comprise, reaches 8 volts and will remain in the state until this voltage drops below 4 volts.

The amount of current per pulse that is provided into capacitor 34 is a function of reference voltage VR. When reference voltage VR is raised, a pulse provides more current into capacitor 34 because signal VI is below reference voltage VR longer. For the case where voltage VS is higher, more energy is transferred to reactive circuit 14 per pulse. Thus for a given pulse frequency, a higher voltage for supply voltage VS means there is a higher current supplied at output voltage VO. Thus, for the case where supply voltage VS increases, programmable reference voltage 32 responds to this increase by increasing voltage reference VR. This increase in reference voltage VR increases the current per pulse that is pumped into capacitor 34. By the same reasoning a decrease in supply voltage VS causes programmable reference voltage generator 32 to respond with a decrease in reference voltage VR and the consequent reduction in current per pulse pumped into capacitor 34.

For an increase in voltage VO, a given amount of energy provided by active circuit 12 results in a reduced amount of current being supplied at output voltage VO. Thus reference voltage VR needs to be decreased so that less current is pumped into capacitor 34 for a each current pulse. Accordingly, programmable reference voltage generator 32 responds to an increase in output voltage VO by decreasing reference voltage VR. By the same reasoning, a decrease in output voltage VO causes programmable reference voltage generator to respond with a higher reference voltage VR and the consequent increase in current per pulse pumped into capacitor 34. A further level of programmability is to change a bias level for reference voltage VR; the bias level being the level of reference voltage VR in the absence of input from output voltage VO and reference voltage VR.

Shown in FIG. 2 is voltage-to-current converter 30 comprising a resistor 52, a PNP transistor 54, a PNP transistor 56, an N channel transistor 58, an N channel transistor 60-, a PNP transistor 62, a PNP transistor 64, an N channel transistor 66, an N channel transistor 68, a resistor 70, a PNP transistor 72, a PNP transistor 74, an N channel transistor 76, and an N channel transistor 78. Resistor 52 has a first terminal connected to the power supply terminal that is for receiving supply voltage VS and a second terminal. Transistor 54 has an emitter connected to the first terminal of resistor 52 and a base and collector connected together. Transistor 56 has an emitter connected to the base and collector of transistor 54 and a base and collector connected together. Transistor 58 has a drain connected to the base and collector of transistor 56, a gate for receiving a bias voltage VB1, and a source. Transistor 60 has a drain connected to the source of transistor 58, a gate for receiving a bias voltage VB2, and a source connected to ground. Transistor 62 has an emitter for receiving reference voltage VR, a base connected to the base and collector of transistor 54, and a collector. Transistor 64 has an emitter connected to the collector of transistor 62, a base connected to the base of transistor 56, and a collector. Transistor 66 has a drain connected to the collector of transistor 64, a gate, and a source. Transistor 68 has a drain connected to the source of transistor 66, a gate, and a drain connected to ground. Resistor 70 has a first terminal for receiving signal VI and a second terminal. Transistor 72 has an emitter connected to the second terminal of resistor 70, a base connected to the base of transistor 62, and a collector. Transistor 74 has an emitter connected to collector of transistor 72, a base connected to the base of transistor 64, and a collector. Transistor 76 has a gate and a drain connected to the collector of transistor 74, and a source. Transistor 78 has a drain and a gate connected to the source of transistor 76 and a source connected to ground.

Resistor 52 and transistors 54, 56, 58, and 60 form a bias circuit 80 that carries a relatively low current. Transistors 54 and 60 alone would be sufficient to provide the needed bias function but transistors 56 and 58 are added to provide voltage division so as to prevent the breakdown voltage of transistors 54 and 60 being exceeded. The transistor sizes and bias voltages VB1 and VB2 are chosen to achieve the desired bias current. An exemplary current is 25 microamps for bias circuit 80. Resistor 52 is made to be the same resistance as the sum of the resistances of resistor 28 shown in FIG. 1 and resistor 70. Bipolar transistors 54, 56, 62, 64, 72 and 74 are made to be of the same size. N channel transistors 58, 60, 66, 68, 76, and 78 are made to be of the same size. Resistor 70 can be made from a combination of resistors in parallel and/or in series to achieve the needed resistance. Similar for resistor 28 in FIG. 1, resistor 28 may need to be many resistors in parallel in order to achieve the needed resistance while avoiding overheating a single resistor. An effective technique for matching resistances is to choose a particular size resistor and replicate it as many times as necessary in the various parallel and series combinations needed to achieve the desired resistive relationship.

In operation transistors 76 and 78 are connected as current mirrors to transistors 66 and 68 so that the current through transistors 76 and 78 is mirrored to transistors 66 and 68 so that transistors 66 and 68 will normally be required to carry essentially the same current as that passing through transistors 76 and 78. The bases of transistors 62 and 72 are tied to the same voltage set by bias circuit 80. When there is a no load condition for voltage VO, the input voltage VI should nearly always be at the supply voltage VS because demand switch controller 16 only rarely generates pulses. With the input signal VI at the supply voltage VS, input signal VI exceeds reference voltage VR. In such case more current flows through transistor 72 than transistor 62 and similarly, more current passes through transistor 74 than transistor 64. The current through transistors 72 and 74, minus the base currents, pass through transistors 76 and 78. Similarly, the current through transistors 62 and 64, minus the base currents, pass through transistors 76 and 78. Transistors 76 and 78, passing more current than the current passing through transistors 62 and 64 minus base current, results in a deficiency in the current through transistors 66 and 68 that is made up by withdrawing current from capacitor 34 of FIG. 1. This connection between transistors 64 and 66 is the output node of converter 80 and provides capacitor current IC. This current will continue to be withdrawn as long as input signal VI stays at supply voltage VS and it is possible to withdraw current from capacitor 34. Eventually capacitor with be sufficiently discharged that the voltage level is too low for transistors 66 and 68 to withdraw more current. This voltage would be well below the turnoff voltage of Schmitt Trigger 36, which in this example is four volts.

For the case in which a pulse is generated that causes transistor 22 to be conductive, input signal VI will begin dropping in inversely tracking the current through transistor 20 into inductor 40. As input voltage VI drops, it will eventually drop low enough that the emitter of transistor 72 is at a lower voltage than the emitter of transistor 62. When that happens, more current begins flowing through transistors 62 and 64 than through transistors 72 and 74 and thus more current is at the node between transistors 64 and 66 than is passing through transistors 76 and 78. Thus there is an excess current at the output node so that capacitor current IC, in the amount of the excess, flows into capacitor 34. As the current supplied by transistor 20 increases so that the input voltage VI continues to drop, less and less current flows through transistors 76 and 78 which causes a greater and greater excess at the output node so that more and more capacitor current IC flows into capacitor 34. When input signal VI is at its lowest level, the excess current that causes capacitor current IC to pump capacitor 34 is significantly greater than is the current deficiency that causes capacitor current IC to withdraw current from capacitor 34. The effect is that capacitor 34 can be filled with charge much faster than it can be discharged, but even discharging is relatively fast for most applications. For example, in the absence of a load, discharging of the capacitor can easily be achieved in less than two milliseconds. The amount of filling of capacitor 34 with charge per pulse is altered by altering reference voltage VR.

Shown in FIG. 3 is programmable voltage reference 32 comprising a resistor 82, a programmable current source 84, a programmable current source 86, and a programmable current source 88. Resistor 82 has a first terminal connected to the power supply terminal that is for receiving supply voltage VS, and a second terminal that is the point at which programmable reference voltage generator 32 provides it output, reference voltage VR. Programmable current source 84 has a first current terminal connected to the second terminal of resistor 82, a second current terminal connected to ground, and a control terminal for receiving the output voltage VO. Programmable current source 86 has a first current terminal connected to the second terminal of resistor 82, a second current terminal connected to ground, and a control terminal for receiving the supply voltage VS. Programmable current source 88 has a first current terminal connected to the second terminal of resistor 82, a second current terminal connected to ground, and a control terminal for receiving a bias signal VB. The inputs at the control inputs of the current sources 84–88 can be either the actual voltage or a representation of the voltage level. For example, it may be difficult to actually obtain the output voltage VO but the intended level for the output voltage may be known. Thus, instead of the control input of current source 84 being the actual output voltage VO, it may be a digital signal that represents a voltage level for output voltage VO. Resistor 82 is made to be the same resistance as resistor 52 of FIG. 2.

In operation, current source 84 draws current through resistor 82 in amount that is selected based on the output signal VO. If output voltage VO is increased, then the current drawn by current source 84 is decreased to increase reference voltage VR. An increase in the level of reference voltage VR results in a longer and bigger difference between input signal VI and signal VR so that capacitor 34 receives more current for each pulse that is applied to transistor 20. Similarly, if output voltage VO is decreased, then the current drawn by current source 84 is increased to decrease reference voltage VR. For current source 86, current is increased for increases in supply voltage VS to decrease reference voltage VR. A decrease in the level of reference voltage VR results in a shorter and lesser difference between input signal VI and signal VR so that capacitor 34 receives less current for each pulse that is applied to transistor 20. Similarly, a decrease in supply voltage VS results in less current being drawn by current source 86. Current source 88 is preferably adjustable as shown in order to providing maximum adjustment of reference voltage VR in response to supply voltage VS and/or output voltage VO. It may be that the intended output voltage VO is fixed so that the only actual variable is supply voltage. In such case it may well be satisfactory to have just two of the current sources programmable. Further, if the circuit is sufficiently repeatable in manufacturing, it may only be necessary to have programmability based on supply voltage VS.

In the foregoing specification, the invention has been described with reference to specific embodiments. However, one of ordinary skill in the art appreciates that various modifications and changes can be made without departing from the scope of the present invention as set forth in the claims below. For example, one type of reference voltage generator was described but other schemes may well be effective also. As another example, to form an integrator of the type needed, capacitor 34 can be replaced by a resistance, and comparator 36 can be replaced by a low pass filter, which may be as simple as a capacitor, in order to provide an analog output voltage proportional to load current. This can be accomplished without the need to sense load current directly, but can still provide good accuracy. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An active circuit for being coupled to a reactive circuit that provides an output voltage, comprising:
   a control regulator circuit having an output for providing pulses;
   a first switch that has an input coupled to the output of the control regulator curcuit, a power supply input coupled to a power supply terminal, and an output that is an output of the active circuit;
   a pulse shaper having an input coupled to the control regulator circuit and an output;
   a reference voltage generator for providing a reference voltage that changes in response to changes in a voltage at the power supply terminal; and
   an integrator having a first input coupled to the output of the pulse shaper, a second input for receiving the reference voltage, and an output for providing a signal indicative of a current level supplied at the output voltage, wherein:
   the reference voltage generator is responsive to a first programming signal in addition to being responsive to the voltage at the power supply terminal;
   the first programming signal is representative of the output voltage; and
   the first programming signal is the output voltage.

2. The active circuit of claim 1 further comprising a crowbar switch coupled to the control regulator circuit and a crowbar comparator coupled to the crowbar switch.

3. The active circuit of claim 1, wherein the pulse shaper comprises:
   a first transistor having a control electrode coupled to the output of the control regulator circuit, a first current electrode coupled to the output of the first switch, and a second current electrode; and
   a first resistor having a first terminal coupled to the second current electrode of the first transistor and a second terminal coupled to the power supply terminal.

4. The active circuit of claim 1, wherein the integrator comprises:
   a voltage-to-current converter having a first input coupled to the output of the pulse shaper, a second input to the output of the reference voltage generator, and an output; and
   a capacitor coupled to the output of the voltage-to-current converter.

5. The active circuit of claim 1, wherein the first switch comprises an N channel transistor.

6. An active circuit, comprising:
   pulse means for generating current pulses from a supply voltage for use in providing a DC output voltage;
   replication means, coupled to the pulse means, for generating pulses representative of the current pulses;
   reference means for providing a reference voltage based on information as to the DC output voltage and the supply voltage;
   comparator means, coupled to the replication means and the reference means, for generating current pulses, wherein each pulse has an amount of charge related to the reference voltage; and
   a capacitor for receiving the current pulses;
   wherein the information as to the DC output voltage is the DC output voltage.

7. The active circuit of claim 6 further comprising a crowbar switch coupled to the pulse means and a crowbar comparator coupled to the crowbar switch.

8. The active circuit of claim 6, wherein the replication means comprises:
   a transistor coupled to the pulse means; and
   resistor means for being coupled between the transistor and the supply voltage.

9. The active circuit of claim 6, wherein the reference means comprises three current sources and a resistor.

10. The active circuit of claim 6, further comprising a Schmitt Trigger coupled to the capacitor.

11. The active circuit of claim 6, wherein;
    the information as to the DC output voltage is a first programming signal; and
    the reference means is responsive to a second programming signal.

* * * * *